United States Patent
Fang et al.

(10) Patent No.: US 11,003,773 B1
(45) Date of Patent: May 11, 2021

(54) SYSTEM AND METHOD FOR AUTOMATICALLY GENERATING MALWARE DETECTION RULE RECOMMENDATIONS

(71) Applicant: FireEye, Inc., Milpitas, CA (US)

(72) Inventors: Chunsheng Fang, Mountain View, CA (US); Wei Quan, San Jose, CA (US); Richard Lai, Mountain View, CA (US); Robert Venal, Milpitas, CA (US); Benjamin Chang, Berkeley, CA (US)

(73) Assignee: FireEye, Inc., Milpitas, CA (US)

( * ) Notice: Subject to any disclaimer, the term of this patent is extended or adjusted under 35 U.S.C. 154(b) by 312 days.

(21) Appl. No.: 15/942,082

(22) Filed: Mar. 30, 2018

(51) Int. Cl.
*G06F 21/56* (2013.01)
*G06F 21/55* (2013.01)
(Continued)

(52) U.S. Cl.
CPC .......... *G06F 21/562* (2013.01); *G06F 21/552* (2013.01); *G06K 9/6232* (2013.01);
(Continued)

(58) Field of Classification Search
CPC ..... G06F 21/562; G06F 21/552; G06N 20/00; G06K 9/6232; G06K 9/6267; H04L 63/1416
See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Christopher C Harris
(74) *Attorney, Agent, or Firm* — Rutan & Tucker, LLP

(57) ABSTRACT

A method for generating rule recommendation utilized in a creation of malware detection rules is described. Meta-information associated with a plurality of events collected during a malware detection analysis of an object by a cybersecurity system is received and a first plurality of features is selected from the received meta-information. Machine learning (ML) models are applied to each of the first plurality of features to generate a score that represents a level of maliciousness for the feature and thereby a degree of usefulness of the feature in classifying the object as malicious or benign. Thereafter, a second plurality of features is selected as the salient features, which are used in creation of the malware detection rules in controlling subsequent operations of the cybersecurity system. The second plurality of features being lesser in number that the first plurality of features.

35 Claims, 8 Drawing Sheets

(51) Int. Cl.
  *G06K 9/62* (2006.01)
  *H04L 29/06* (2006.01)
  *G06N 20/00* (2019.01)

(52) U.S. Cl.
  CPC ........... *G06K 9/6267* (2013.01); *G06N 20/00* (2019.01); *H04L 63/1416* (2013.01)

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |

(56) References Cited

U.S. PATENT DOCUMENTS

| | | | |
|---|---|---|---|
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,385 B1 * | 10/2013 | Bhatkar ............... G06F 21/556 726/22 |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,640,245 B2 * | 1/2014 | Zaitsev ................ G06F 21/566 726/25 |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,288,220 B2 * | 3/2016 | Raugas ............... H04L 63/1408 |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,690,937 B1 * | 6/2017 | Duchin ............... G06F 21/552 |
| 9,690,938 B1 * | 6/2017 | Saxe ..................... G06F 21/563 |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |

(56) References Cited

U.S. PATENT DOCUMENTS

| | | |
|---|---|---|
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,187,401 B2 * | 1/2019 | Machlica ............ H04L 63/1416 |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,230,749 B1 * | 3/2019 | Rostami-Hesarsorkh .................. H04L 63/1425 |
| 10,242,185 B1 | 3/2019 | Goradia |
| 10,313,379 B1 * | 6/2019 | Han ........................ G06N 7/005 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |

(56) References Cited

U.S. PATENT DOCUMENTS

| | | |
|---|---|---|
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |

(56) References Cited

U.S. PATENT DOCUMENTS

| | | |
|---|---|---|
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0304244 A1* | 11/2012 | Xie .................. G06F 21/53 726/1 |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180883 A1* | 6/2015 | Aktas .................. G06F 21/564 726/23 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0277423 A1* | 9/2016 | Apostolescu ....... H04L 63/1425 |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0099304 A1* | 4/2017 | Anderson ............. G06F 16/285 |
| 2018/0013770 A1 | 1/2018 | Ismael |
| 2018/0048660 A1 | 2/2018 | Paithane et al. |
| 2018/0060738 A1* | 3/2018 | Achin .................. G06Q 10/04 |
| 2018/0121316 A1 | 5/2018 | Ismael et al. |
| 2018/0276560 A1* | 9/2018 | Hu ........................ G06N 20/00 |
| 2018/0288077 A1 | 10/2018 | Siddiqui et al. |
| 2019/0132334 A1* | 5/2019 | Johns .................. G06F 21/562 |
| 2019/0199736 A1* | 6/2019 | Howard ............... G06F 21/566 |
| 2019/0260779 A1* | 8/2019 | Bazalgette .......... G06F 3/04842 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.jsp?reload=true&amumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

(56) References Cited

OTHER PUBLICATIONS

Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists_org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., "'Analyzing and exploiting network behaviors of malware.'", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.

(56) References Cited

OTHER PUBLICATIONS

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

FIG. 2B (150)

```
57) <RegisterKey = delete>...<Time='4241'>...<value=<location of registry key in OS>...<path = C:\Users\Admin\ObjectStor\Temp\object1.exe>...<hash=eb630b6509eff429d94069588e8348d6>...
...
59) <file mode = "failed">...<Time='4286'>...<path = C:\Users\Admin\ObjectStor\Temp\object1.exe>...<hash=eb630b6509eff429d94069588e8348d6>...
...
69) <API call>...<Time='4307'>...<path = C:\Users\Admin\ObjectStor\Temp\object1.exe>...<hash=eb630b6509eff429d94069588e8348d6>...<Apiname=Sleep>...<Address=0x4218d89e>... — 152
...
71) <mutex>...<Time='4314'>...<value= Session\1\BaseObjects\Countermutex>...<path = C:\Users\Admin\ObjectStor\Temp\object1.exe>...<hash=eb630b6509eff429d94069588e8348d6>...
...
```

FIG. 2C (160)

```
...
<RegisterKey = delete>...<Time='4241'>...<value=<location of registry key in OS>...<path = C:\Users\Admin\ObjectStor\Temp\object1.exe>...<hash=eb630b6509eff429d94069588e8348d6>...  — 164
<file mode = "failed">...<Time='4286'>...<path = C:\Users\Admin\ObjectStor\Temp\object1.exe>...<hash=eb630b6509eff429d94069588e8348d6>... — 164
<API call>...<Time='4307'>...<path = C:\Users\Admin\ObjectStor\Temp\object1.exe>...<hash=eb630b6509eff429d94069588e8348d6>...<Apiname=Sleep>...<Address=0x4218d89e> — 162
<mutex>...<Time='4314'>...<value= Session\1\BaseObjects\Countermutex>...<path = C:\Users\Admin\ObjectStor\Temp\object1.exe>...<hash=eb630b6509eff429d94069588e8348d6>... — 164
...
```

SYSTEM AND METHOD FOR AUTOMATICALLY GENERATING MALWARE DETECTION RULE RECOMMENDATIONS

FIELD

Embodiments of the disclosure relate to cybersecurity. More particularly, one embodiment of the disclosure relates to an analytic tool and corresponding method for automatically generating malware detection rule recommendations based on events monitored by a cybersecurity system.

GENERAL BACKGROUND

Network devices provide useful and necessary services that assist individuals in business and in their everyday lives. In recent years, a growing number of cyberattacks are being conducted on all types of network devices. In some cases, these cyberattacks are orchestrated in an attempt to gain access to content stored on one or more network devices. Such access is for illicit (i.e., unauthorized) purposes, such as spying or other malicious or nefarious activities. For protection, cybersecurity appliances may be deployed at a local network in efforts to detect a cyberattack caused by a malicious object being uploaded to a network device.

Currently, some advanced cybersecurity appliances perform a two-phase approach for detecting malware contained in network traffic. This two-phase approach includes a static phase and a dynamic phase. During the dynamic phase, a virtual machine deployed within the cybersecurity appliance executes objects obtained from the network traffic being analyzed and monitors the behaviors of each object during execution. Each behavior, also referred to as an "event," include meta-information associated with that event.

Conventional cybersecurity appliances rely on malware detection rules in controlling what events are being monitored and subsequently analyzed in efforts to classify the objects under analysis as either malicious (malware) or benign. As a result, the malware detection rules greatly influence the effectiveness of the cybersecurity appliance in determining whether or not an object is associated with malware. Given a constantly changing threat landscape, the malware detection rules are frequently evaluated and updated to maintain their effectiveness.

The generation of malware detection rules is a highly specialized, time intensive task. Currently, in response to an uncovered analytical error committed by a cybersecurity system (e.g., an object misclassification), a human analyst may receive an arcane report listing hundreds or even thousands of detected events that were captured during analysis of the misclassified object at the cybersecurity system. From these detected events, besides attempting to identify trends associated with malware, the analyst is responsible for (i) identifying detected events that are highly suggestive of the object being malicious or benign, and (ii) generating malware detection rule updates to avoid such object misclassifications in the future. Given the subjective nature of the review, the manual generation of these malware detection rule updates is prone to sub-optimal detection rule generation or even (in some cases) error. Also, the slow, arduous review and selection of detected events by an analyst for use as the basis for the malware detection rule updates greatly delays the release of malware detection rule updates, leaving the analyst with little-to-no time to re-evaluate whether any currently deployed malware detection rules are becoming stale (e.g., less efficient or efficacious). Hence, over time, a good percentage of the malware detection rules become repetitive (e.g., in that they detect the same malware as other malware detection rules), or non-effective (e.g., in that they no longer detect malware that may be modifying its form or functioning to avoid detection), which inadvertently wastes system resources. The waste of system resources may lead to resource over-utilization, namely system detection inefficiencies resulting in an increase of false negative (FN) detections and/or false positive (FP) classifications.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 2B is an exemplary embodiment of an Event report received by the rule generation system of FIG. 2A.

FIG. 2C is an exemplary embodiment of rule recommendations generated by the rule generation system of FIG. 2A.

DETAILED DESCRIPTION

I. Overview

Figure 1:
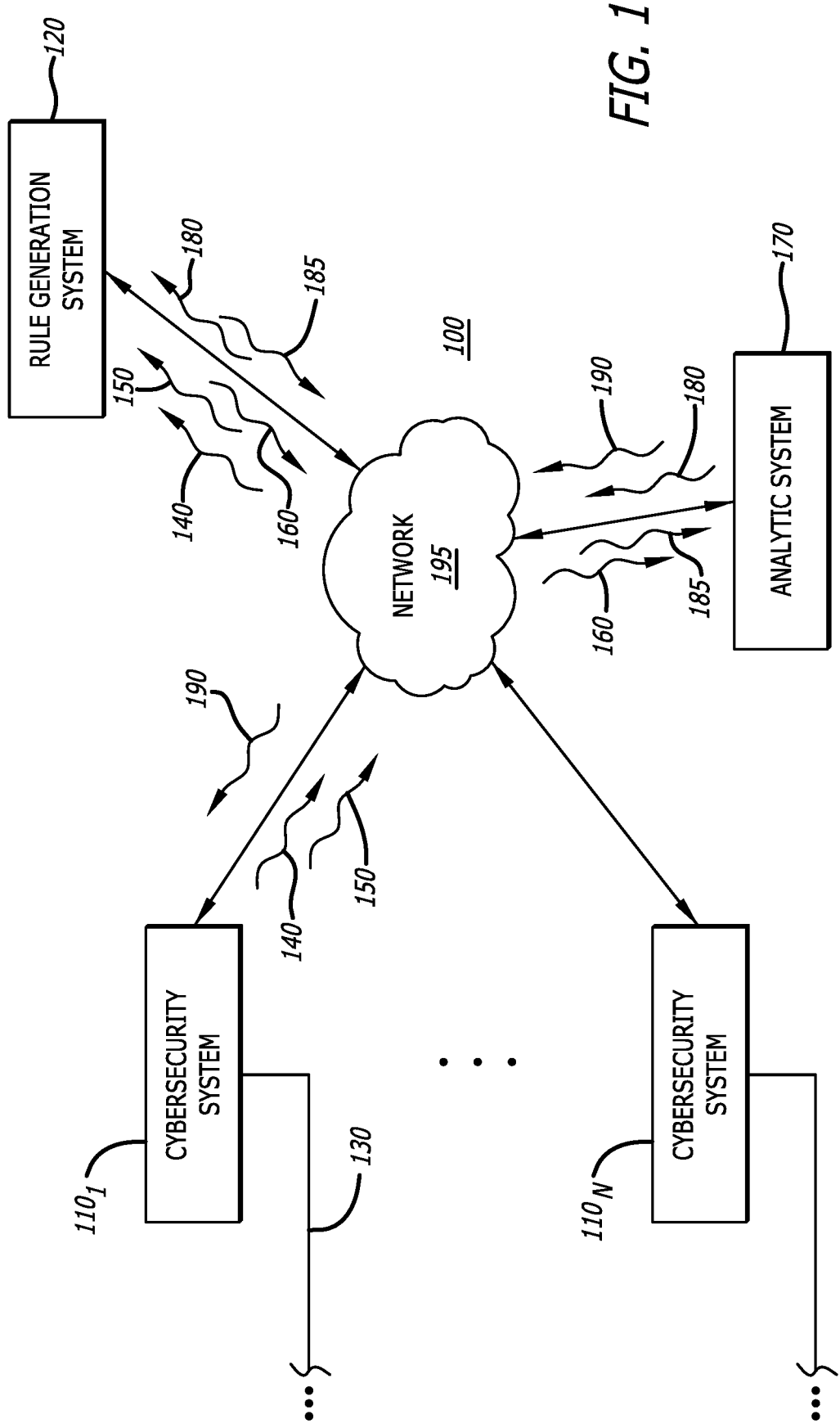
FIG. 1 is an exemplary embodiment of an architecture of an automated, cybersecurity protection service including one or more cybersecurity systems communicatively coupled to a rule generation system.

In general, one embodiment of the disclosure relates to a malware detection rule generation system that is designed to shorten the time duration currently needed to create efficacious malware detection rules in efforts to address the constantly changing threat landscape. For this embodiment of the disclosure, the rule generation system includes a receiver configured to receive meta-information associated with a plurality of events (e.g., monitored characteristics or behaviors) detected during malware analysis of an object by one or more cybersecurity systems (e.g., cybersecurity appliances and/or detection agents deployed on network devices). The received meta-information may be obtained from a log that maintains detected events based on operations performed by malware detection rules associated with dynamic analysis (e.g., isolated execution) as well as static analysis (object characteristics are analyzed without execution), correlation of detected events, and/or classification of the object (determining whether to classify the object as malicious, benign or any other selected classification to categorizing the object).

Each cybersecurity system is configured to conduct analyses of objects to determine whether any of the objects may be associated with malware. Each analysis may include (i) inspection of the objects as to form or content, (ii) processing an object within one or more virtual machines, and monitoring for selected events or combinations of events of the object and/or the virtual machine produced during such processing, and/or (iii) detecting occurrences of any of these monitored events or combinations of events or an absence of such event(s). Hence, the receiver is configured to receive meta-information associated with monitored events from each cybersecurity system.

As described below, according to one embodiment of the disclosure, the receiver of the rule generation system includes a parser and feature extraction logic. The parser extracts meta-information associated with the monitored events and converts the meta-information into a structured format (if not already in such format) according to event type. The feature extraction logic is configured to access one or more portions of the meta-information associated with each monitored event (hereinafter, "feature") and provide that feature to the rule recommendation subsystem as described below.

Herein, a "feature" may be categorized as either (1) a portion of the meta-information where an occurrence of such meta-information, which is associated with one or more events of the plurality of events, may assist in determining a level of maliciousness of an object, or (2) repetitive patterns within text of the meta-information discovered using a sliding window (e.g., N-Gram, Skip-Gram, etc.), which may lead to rule candidate patterns. For the first category, the feature may constitute the portion of the meta-information itself in which a single occurrence of that portion of meta-information is a probative factor in determining the maliciousness of an object (e.g., object hash value, path identifying location of the object, Application Programming Interface (API) name, etc.). Alternatively, the "feature" may constitute a number of occurrences (i.e., aggregate) of a particular event within a determined period of time that exceeds a set threshold signifying a malicious activity (e.g., excessive API calls, excessive function calls such as a Sleep function, etc.).

The rule generation system further includes a data store and a rule recommendation subsystem. The data store provides temporary storage for the selected features associated with the events received via the receiver. The rule recommendation subsystem is configured to generate one or more rule recommendations, which are based on the selected features that are analyzed using one or more software machine learning (ML) models trained using supervised learning with malicious events associated with known malware or benign events associated with known goodware (that is, non-malicious software). For instance, a family of these supervised learning models such as Gradient Boosted Tree Ensemble models, Support Vector Machines, Bayesian Graphical Models, Hidden Markov Models, or Deep Neural Networks models for example, may be applied to build a predictive model to identify salient features that lead to rule recommendations. A "salient" feature is a feature that, based on the rule recommendation subsystem, is statistically discriminative in differentiating a "malicious" event from a "benign" event. Hence, a feature may not be "salient" when that feature does not contribute to prediction as some features may operate as a basis or foundation for enabling discovery of certain salient features.

More specifically, according to one embodiment of the disclosure, a plurality of ML models are utilized by the rule recommendation subsystem, where each ML model is configured to analyze features associated with a specific event type or a specific combination of event types. Hence, upon selecting certain features from meta-information of an event or a combination of events (e.g., a first event, a second event, a combination of first and second events, etc.), the feature extraction logic provides such features to a dedicated ML model trained to analyze features associated with that specific event type (e.g., first event type, second event type, combination of first and second event types, etc.). Examples of event types may include, but are not limited or restricted to communication port accesses, various file commands (e.g., open file, close file, etc.), mutex, registry key changes, or the like.

The application of the ML model may result in a predicted classification for the feature as potentially malicious, benign or suspicious (i.e., neither malicious nor benign) based on known malware/goodware. The predicted classification may be represented by a score that conveys a level of maliciousness for the feature and thereby its usefulness in classifying an object as malicious or benign based on this feature. The score assigned to the feature may be further adjusted based on a selected weighting scheme (e.g., increase scores for features with a higher probability of being associated with malware and/or decrease scores for features with a lesser probability of being associated with malware). The ML model result may further include information supporting (or explaining the rationale behind) the assigned score, as described below.

Additionally, while some ML models may correspond to different event types (i.e., an API-based ML model applied to feature(s) associated with the API call), other ML models may be configured to analyze parameters that are based on an aggregate of events occurring within a set time period or an absence of certain events. For these ML models, the aggregate of the events (e.g., number of total API calls within the set period of time), and not the presence of the event (or feature) per se, is considered when generating a score.

For a group of features having a ML prediction score that surpasses a selected threshold and is not concentrated in a specific event type, which may be controlled by limiting number of the features that are considered to be the "salient" features (i.e. limit the number of features associated with any event type to less than a maximum event threshold). The salient features form the basis for the rule recommendations provided to an analytic system. According to one embodiment of the disclosure, the format of the rule recommendations is selected to reduce the amount of meta-information provided to the analytic system (i.e., exclude meta-information associated with events without a salient feature) and highlight the salient features. For example, the salient features may be highlighted by (1) altering the ordering of the meta-information associated with each event including one or more salient features in order to prominently display the salient feature(s); (2) modifying the visual perception of the salient features referenced in the meta-information (e.g. display window or portion of a window, color, size, type, style, and/or effects); (3) extracting the salient features and providing only the salient features to the analytic system; and/or (4) reordering the salient features within the meta-information for placement at a prescribed location within the meta-information. The last two examples may be used for automated rule generation where the extraction and/or ordering allow for parsing of the salient features and automated rule generation by logic implemented within the analytic system (e.g., artificial neural network logic).

Thereafter, one or more provisional malware detection rules (i.e., a Boolean logic representation of the salient features) are generated based on the rule recommendations, and these provisional malware detection rule(s) are tested at one or more cybersecurity systems. After a prescribed period of time, for each provisional malware detection rule, if the malware analysis performance results (telemetry) associated with that provisional malware detection rule conveys a number or rate of false positive (FP) classifications below a first test threshold and/or a number or rate of false negatives (FN) classifications below a prescribed second test threshold, where the first and second test thresholds may differ from each other, the provisional malware detection rule is uploaded to one or more cybersecurity systems as a final malware detection rule for detecting and blocking malware. Otherwise, the features associated with the provisional malware detection rules may undergo additional back testing in which some provisional malware detection rules associated with certain features may be removed and other provisional malware detection rules associated with additional features may be added in efforts to address the FPs and/or FNs.

As an illustrative example, the cybersecurity system, such as a cybersecurity appliance for example, may perform a malware detection analysis on an object and the detected events are collected and provided, directly or indirectly, to a rule generation system. The events may be captured at an operating system (OS) level in the VM or even outside the VM and relate to behaviors of the object. For this embodiment, the plurality of detected events are provided as an indexed aggregate of detected events sometimes referred to as an "Event report," as shown in FIG. 2B. The rule generation system receives the Event report, selects the features associated with one or more of the detected events (where the features selected vary depending on the event type), and stores meta-information associated with each of the features in a data store accessible by the rule recommendation subsystem. The rule recommendation subsystem includes logic that (i) determines what event type pertains to a particular feature (as the feature may be extracted from meta-information associated with a particular event or a combination of events) and (ii) applies a specific ML (software) model to the feature, where the specific ML model corresponds to the particular event type or combination of event types. Based on the predicted results produced by the ML models, the rule recommendation subsystem generates one or more malware detection rule recommendations, which may be expressed in terms of the meta-information as shown in FIG. 2C (or another format) with the salient features highlighted. The malware detection rules (or provisional malware detection rules) may include a string of Boolean logic that, when processed, more accurately identifying objects associated with malware given the elimination (or at least substantial decrease) of the subjective component in malware detection rule generation.

According to one embodiment of the disclosure, the malware detection rule recommendations may be further altered based on testing and experiential knowledge by an analyst. The alteration of the rule recommendations may involve removal of, or modification or addition to some of these rule recommendations (i.e., selected malicious and/or suspicious features). The alteration of the rule recommendations can be further tested (verified) against known malicious events and known benign events to determine the suitability of finalized malware detection rules to be uploaded to the cybersecurity appliance. Through ML-based formulation of these rule recommendations, the generation of the finalized malware detection rules to address newly uncovered threats may be more quickly developed.

The rule generation system also comprises a pipeline for re-training the ML models, either on demand, or when the key performance indicators (KPI) deteriorates as determined using open source or commercial available tools. For instance, occasionally there may be new malware or threat actors with new TTP (Tactics, Techniques and Procedures) that can evade an existing ML model trained using stale training sets. When the KPI deteriorates, the rule generation system may alert a system administrator to re-train the supervised ML model on the new dataset with malware and goodware, so that the ML model can adapt to the constantly evolving threat landscape.

II. Terminology

In the following description, certain terminology is used to describe various features of the invention. For example, each of the terms "logic," "system," and "subsystem" may be representative of hardware, firmware or software that is configured to perform one or more functions. As hardware, the term logic (or engine or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or system or subsystem) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "object" generally relates to information having a logical structure or organization for malware analysis. The information may include an executable (e.g., an application, program, code segment, a script, dll or any file in a format that can be directly executed by a computer such as a file with an ".exe" extension, etc.), a non-executable (e.g., a file; any document such as a Portable Document Format "PDF" document; a word processing document such as Word® document; an electronic mail "email" message, web page, etc.), or simply a collection of related data (e.g., packets).

The term "computerized" generally represents that any corresponding operations are conducted by hardware in combination with software and/or firmware. The term "data store" generally refers to a data storage device such as the non-transitory storage medium described above, which provides non-persistent or persistent storage for the information (e.g., events). An "event" may be construed as an activity that is performed by an object during execution and/or the meta-information associated with the activity. The meta-information may include, but is not limited or restricted to event type (e.g., file command, mutex, time query, API call, etc.), object name, object path, hash value of the object, timestamp, process identifier, or the like.

According to one embodiment of the disclosure, the term "malware" may be broadly construed as any code, communication or activity that initiates or furthers a cyberattack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, to gain unauthorized access, harm or co-opt operations of the network, the network device or the software, or to misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an unauthorized or malicious manner; (2) alter the functionality of the network device executing that application software without any malicious intent; and/or (3) provide unwanted functionality which may be generally acceptable in another context.

The term "network device" may be construed as any electronic computing system with the capability of processing data and connecting to a network. The network may be a public network such as the Internet and/or a local (private) network such as an enterprise network, a wireless local area network (WLAN), a local area network (LAN), a wide area network (WAN), or the like. Examples of a network device may include, but are not limited or restricted to an endpoint (e.g., a laptop, a mobile phone, a tablet, a computer, a video console, a copier, etc.), a network appliance, a server, a router or other intermediary communication device, a firewall, etc.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device such as one or more Application Programming Interfaces (APIs).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, an exemplary block diagram of an embodiment of an architecture of an automated, cybersecurity protection service 100 is shown. Herein, the cybersecurity protection service 100 includes one or more cybersecurity systems $110_1$-$110_N$ (N≥1) communicatively coupled to a malware detection rule generation system (hereinafter, "rule generation system") 120. Deployed for detecting and protecting a local network of a customer against cyberattacks, each of the cybersecurity systems $110_1$-$110_N$ is configured to analyze incoming objects for malware. Such analyses may include processing (e.g., executing) the objects, monitoring for selected events (e.g., behaviors) or combinations of events performed by the object during such processing, and capturing meta-information associated with any of these monitored events or combinations of events upon detection.

More specifically, each of the cybersecurity systems $110_1$-$110_N$ (e.g., cybersecurity system $110_1$) may be deployed as a network device, which is communicatively coupled to receive and analyze objects within network traffic (e.g., object of incoming network traffic, objects propagating in network traffic over a local network 130, etc.). As a network device, the cybersecurity system $110_1$ includes logic being physical components that analyze incoming objects for malware, such as a processor and memory including, in some embodiments, one or more virtual machines, software (e.g., OS(es), application(s), plug-in(s), etc.) to instantiate each of the virtual machines, and monitoring logic to monitor for certain events (e.g., behaviors) conducted by an object running in a virtual machine (VM). Alternatively, the cybersecurity system $110_1$ may be deployed as a virtual device, namely a software (daemon) agent to detect cyberattacks, which may operate in the foreground or background for a network device (e.g., an endpoint). For both of these deployments, component(s) within the cybersecurity system $110_1$ monitor for certain events performed by the object and collect meta-information associated with the events, which is provided to the rule generation system 120 for analysis. Stated differently, the collected meta-information may be obtained from a log as described above, such as a behavior log, endpoint dynamic behavior monitor log, or a static PE (portable execution) file that contains API calls, file accesses, etc.

Each of the cybersecurity systems $110_1$-$110_N$ (e.g., cybersecurity system $110_1$) may be deployed on-premises (e.g., as an edge network device for the local network 130, as a network device within the local network 130) to detect and analyze objects propagating into or through the local network 130 for malware. Alternatively, although not shown, each of the cybersecurity systems $110_1$-$110_N$ may be deployed as a cloud-based solution in which the objects (or a representation thereof) are captured at the local network 130 and submitted to at least one of the cloud-based cybersecurity systems $110_1$-$110_N$. Additionally, although not shown, at least one of the cybersecurity systems $110_1$-$110_N$ (e.g., cybersecurity system $110_1$) may be deployed at an endpoint as a software agent operating in the background to analyze and monitor for certain behaviors by the object.

Referring still to FIG. 1, each of the cybersecurity systems $110_1$-$110_N$ is configured to transmit an analysis result 140 to the rule generation system 120. Such transmission may be aperiodic (e.g., upon completion of an analysis of a particular object, system crash, etc.) or periodic (e.g., after prescribed amount of time has elapsed, etc.). According to one embodiment of the disclosure, the analysis result 140 includes events detected during processing of a plurality of objects by the cybersecurity system 110₁ and labels identifying classifications (e.g., benign, malicious) of each object of the plurality of objects. This collection of events may include, but is not limited or restricted to, meta-information association with each monitored event performed, for example, by the object during processing within one or more virtual machines (or by a software agent) deployed within the cybersecurity system 110₁. The analysis result 140 may be used by the rule generation system 120 as training data for a plurality of machine learning (ML) models deployed within the rule generation system 120, as described below.

As shown in FIG. 1, the rule generation system 120 may be implemented within a dedicated network device, which is located remotely from the cybersecurity systems 110₁-110ₙ. As an illustrative embodiment, the rule generation system 120 may be deployed as logic being part of a public cloud computing service or a private cloud computing service (e.g., private cloud, a virtual private cloud or a hybrid cloud). When operating as part of a public cloud computing service, the rule generation system 120 is communicatively coupled to each of the cybersecurity systems 110₁-110ₙ via a public network, as public cloud computing services support a multi-tenant environment. In contrast, when operating as part of a private cloud computing service, the rule generation system 120 may be communicatively coupled to a single cybersecurity system (e.g., cybersecurity system 110₁) where each of the cybersecurity systems 110₁-110ₙ is associated with a different customer, as private cloud computing services support a single-tenant environment.

Besides the analysis results 140, the rule generation system 120 further receives an event summary 150, namely a plurality of events being monitored and detected during processing of a particular object upon which more in-depth analysis is requested. This particular object may correspond to an object upon which a malware detection analysis by the cybersecurity system 110₁ has completed. For example, the particular object may correspond to an object that, based on telemetry (e.g., malware analysis performance results), has been incorrectly classified in a prior malware detection analysis by the cybersecurity system 110₁ (e.g., FP or FN misclassification). The telemetry may be stored remotely from the rule generation system such as within a private cloud service, public cloud service or other scalable "big data" platform.

According to one embodiment of the disclosure, the event summary 150 may be provided as an indexed aggregate of the detected events for the particular object (hereinafter, "Event report 150"). Based on receipt of the events 152 included in the Event report 150 as shown in FIG. 2B, the rule generation system 120 generates one or more malware detection rule recommendations (hereinafter, "rule recommendations") 160. The rule recommendations 160 may be represented as a reduced subset of the events included in the Event report. Additionally, each rule recommendation may further include features 164 (i.e. portions the meta-information associated with its corresponding event) being highlighted to identify the salient features from which provisional (and/or final) malware detection rules are generated.

According to one embodiment of the disclosure, as shown in FIG. 1, the rule recommendations 160 may be further altered automatically (and in real-time) by a network device (e.g., analytic system 170) or the rule recommendations 160 may be altered by an analyst relying on experiential knowledge. The alteration of the rule recommendations 160 may involve removal of, modification or addition to the salient features relied upon in the generation of the rule recommendations 160. The removal or addition of salient features may be accomplished by issuance of a rule modification message 180 from the analytic system 170, which may be initiated by an analyst performing an action on a graphic user interface (GUI) that causes an increase or decrease in number of proposed features that may be used in the generation of provisional malware detection rules 190. The action may include altering a sliding bar to change one or more threshold (score) parameters that defines whether a salient feature is malicious or benign or selecting a radio button to increase/decrease the number of events provided.

Herein, the removal or addition of salient features may be accomplished by issuance of the rule modification message 180 from the analytic system 170, which may cause the rule generation system 120 to increase or decrease at least one threshold parameter used in selecting the salient features and reissue new rule recommendations 185. According to one embodiment, removal or addition of a salient feature by the rule generation system 120 may be accomplished by returning the feature to a non-highlighted or highlighted form and the newly added salient features may be highlighted in the same manner or perhaps in a different manner to more easily identify the new salient features from the prior salient features.

As a first illustrative example, the rule modification message 180 may request a decrease/increase in a first score threshold utilized by the rule generation system 120, where the first score threshold identifies whether a scored feature is "malicious" upon exceeding the first score threshold. Hence, an increase or decrease of the first score threshold caused by the rule modification message 180 may decrease or increase the number of salient features selected for rule consideration. Additionally or as an alternative, as a second illustrative example, the rule modification message 180 may request a decrease/increase in a second score threshold utilized by the rule generation system 120, where the second score threshold identifies whether a scored feature is "benign" upon falling below the second score threshold. Hence, an increase or decrease of the second score threshold caused by the rule modification message 180 may increase or decrease the number of salient "benign" features selected for rule consideration.

Once the rule recommendations are finalized at the analytic system 170, provisional malware detection rules 190 are generated from the finalized rule recommendations. The analytic system 170 transmits the provisional malware detection rules 190 via network 195 to one or more of the cybersecurity systems 110₁-110ₙ (e.g., cybersecurity system 110₁) for initial testing and, generally, verification. Further verification may be conducted by analysis of the operability of the cybersecurity systems 110₁-110ₙ and the results of the verification may be reported therefrom or the analytic system 170.

Figure 2A:
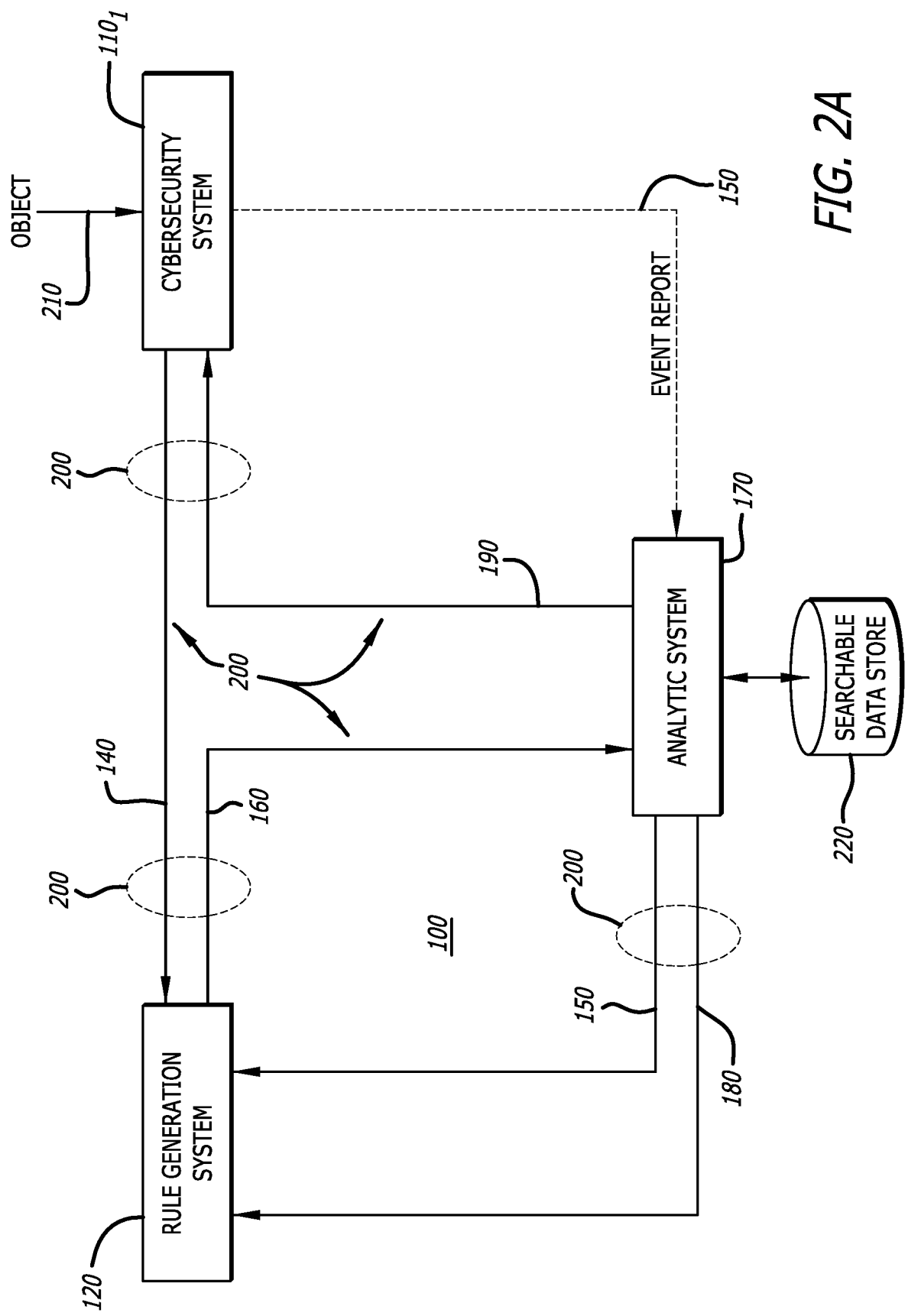
FIG. 2A is an exemplary embodiment of a logical representation of the automated generation of malware detection rule recommendations to more accurately generate malware detection rules that control operability of the cybersecurity system of FIG. 1.

Referring now to FIG. 2A, an exemplary embodiment of a logical representation of the cybersecurity protection service 100 including the rule generation system 120 to expedite generation of malware detection rules that control operation of the cybersecurity system 110₁ of FIG. 1 is shown. Herein, as shown, the cybersecurity system 110₁ is communicatively coupled to the rule generation system 120 via a transmission medium 200. For instance, at or near completion of a malware analysis of an object 210 received as input, the cybersecurity system 110₁ transmits the OS Change report 150 as shown in FIG. 2B for receipt by the rule generation system 120. As shown, the Event report 150 may be sent indirectly to the rule generation system 120 via the analytic system 170, or the Event report 150 may be sent directly to the rule generation system 120.

Upon receipt of the Event report 150 from the cybersecurity system 110₁, the rule generation system 120 parses the Event report 150 to identify and extract meta-information associated with the monitored events. The rule generation system 120 further selects features from the extracted meta-information and conducts an analysis of each feature, using machine learning (ML) models (not shown), to predict the salient features, namely the features having a higher likelihood of assisting in the classification of an object. Herein, each of the ML models is specifically configured to analyze features associated with a different event type and a measure of the predicted likelihood may be referred to as a "score." The ML models are trained, in accordance with supervised learning, using at least the analysis results 140 from the cybersecurity system 110₁ as a training set. It is contemplated that other data, besides the analysis results 140 (e.g., third party data, etc.) may be used in training the ML models, as described below.

Based on the scores assigned to the analyzed features, the rule generation system 120 operates as a filter by (i) reducing the number of analyzed features to be considered as salient features (referred to as "potential salient features") to a first subset of analyzed features, and (ii) further reducing the first subset of analyzed features to a second subset of analyzed features that represent the salient features. According to one embodiment of the disclosure, the potential salient features may be determined by selecting the analyzed features having an assigned score that meets or exceeds a first score threshold (malicious features) and/or analyzed features having an assigned score that meets or falls below a second score threshold (benign features). Thereafter, the salient features may be determined by restricting the number of features associated with an event type from exceeding a maximum event threshold. This may be accomplished by retaining the features for each event type having the highest and/or lowest scores.

According to one embodiment of the disclosure, referring back to FIG. 2A, the analytic system 170 is configured to evaluate and/or alter (e.g., remove, modify, or add) any of the rule recommendations 160 based on experiential knowledge by an analyst at least partially controlling operations of the analytic system 170. Herein, the analyst may be logic coded to determine the salient features based on the assigned score to each feature, which represents the degree of association by the feature with malware or a malicious activity. The logic may be artificial neural network logic (i.e., logic designed and trained to recognize patterns in order to classify incoming data as malicious or benign such as a convolutional neural network "CNN," recurrent neural network "RNN," or the like). Thus, the entire process of rule recommendation, verification, and roll-out to the cybersecurity systems is automated. Alternatively, the analyst may be a human analyst.

Figure 4:
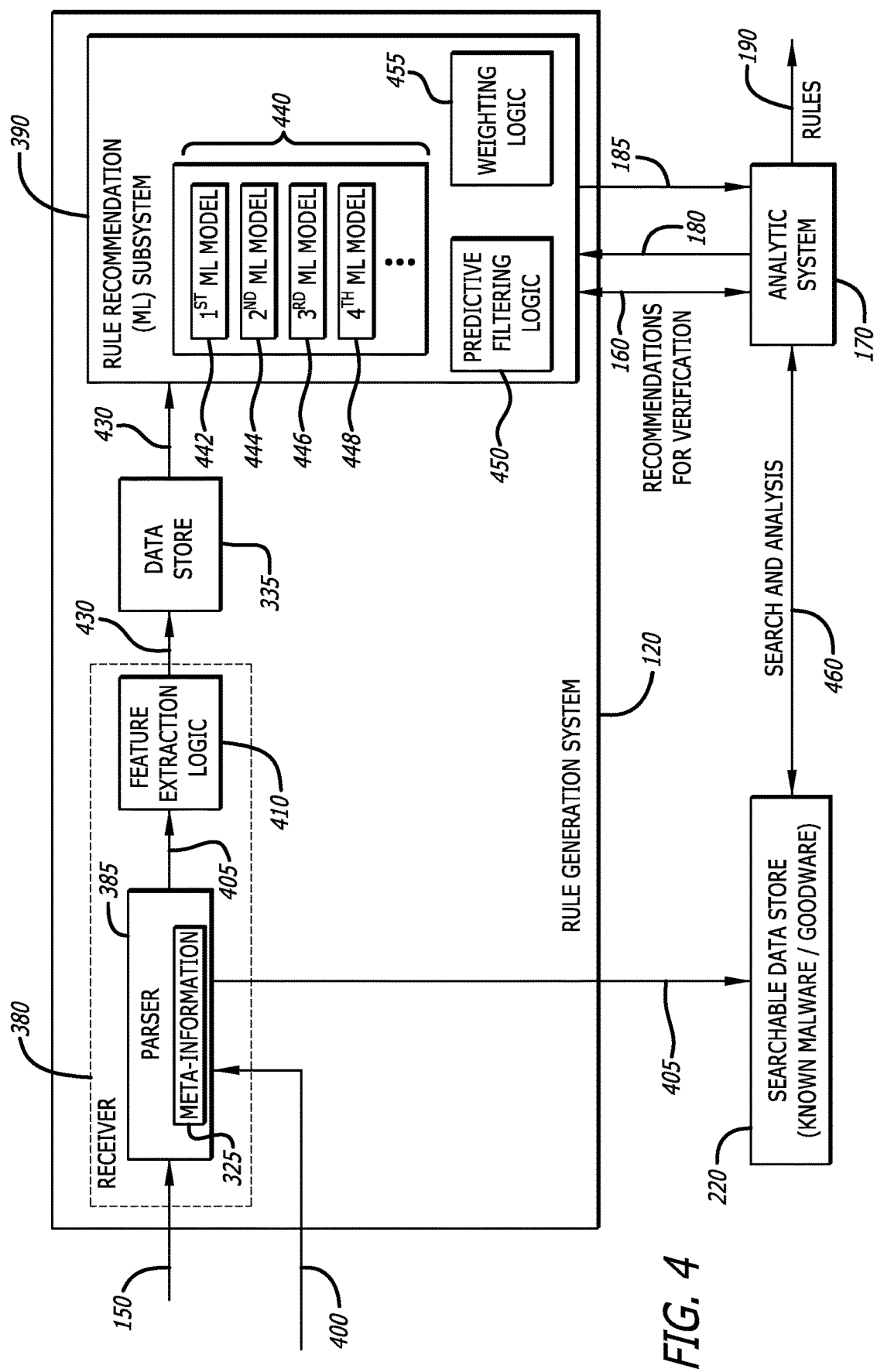
FIG. 4 is an exemplary embodiment of a logical representation of the rule generation system of FIGS. 1-2A.

Thereafter, when finalized, the rule recommendations 160 (or the new rule recommendations 185 in response to alteration of the rule recommendations 160) may be converted into one or more provisional (i.e. recommended) malware detection rules 190. Each provisional malware detection rule 190 may be tested against a searchable data store 220 including meta-information associated with known malware and/or known goodware to determine the suitability of the provisional malware detection rule 190, as shown in FIG. 4. Also, the provisional malware detection rules 190 are provided from the analytic system 170 to the cybersecurity system 110₁ via transmission medium 200. The provisional malware detection rules 190 may operate as provisional malware detection rules for the cybersecurity system 110₁, where telemetry (e.g., performance results) are collected and verified to determine FP/FN results associated with the provisional malware detection rules 190 over a prescribed period of time. In the event that the number of FP/FN results fall below a prescribed threshold, the provisional malware detection rules 190 may be finalized and provided to the cybersecurity system 110₁ for use in malware detection and/or remediation of any uncovered malware (e.g., blocking objects, logging objects for forensic analysis, etc.).

Figure 3:
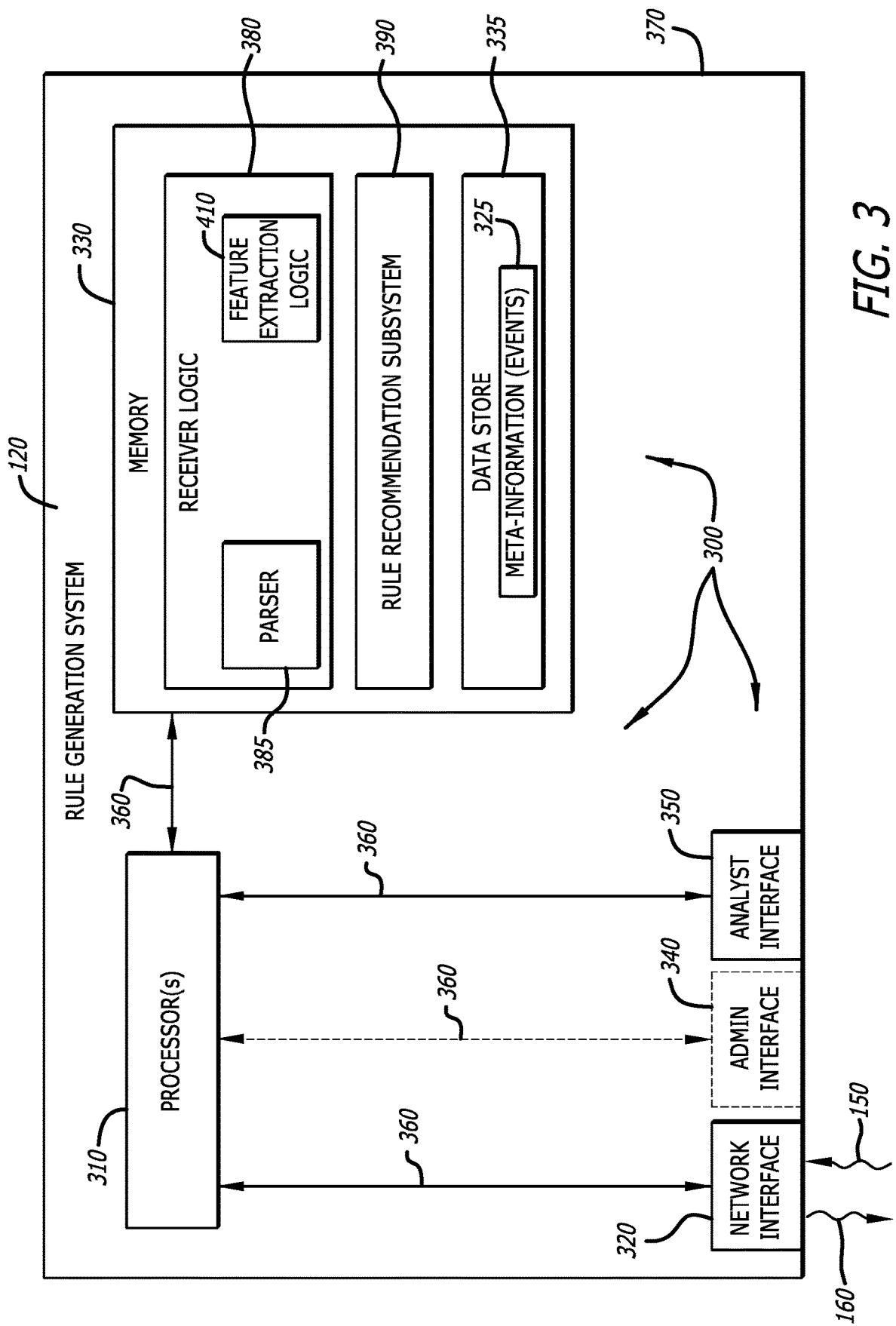
FIG. 3 is an exemplary embodiment of the components deployed within the rule generation system of FIGS. 1-2A.

Referring to FIG. 3, an illustrative embodiment of the rule generation system 120 of FIGS. 1-2A is shown. Herein, the rule generation system 120 features a plurality of components 300, including a processor 310, a network interface 320, a memory 330, an administrative interface 340 and an analyst interface 350, which are communicatively coupled together via a transmission medium 360. As shown, when deployed as a physical network device, the components 300 are at least partially encased in a housing 370 made entirely or partially of a rigid material (e.g., hardened plastic, metal, glass, composite, or any combination thereof). The housing 370 protects these components from environmental conditions. As a virtual device, however, the rule generation system 120 is directed to some or all of the logic within the memory 330.

The processor 310 is a multi-purpose, programmable component that accepts digital data as input, processes the input data according to stored instructions, and provides results as output. One example of a processor may include an Intel® x86 central processing unit (CPU) with an instruction set architecture. Alternatively, the processor 310 may include another type of CPU, a digital signal processor (DSP), an Application Specific Integrated Circuit (ASIC), a field-programmable gate array (FPGA), or the like.

As shown in FIG. 3, the processor 310 is communicatively coupled to the memory 330 via the transmission medium 360. According to one embodiment of the disclosure, the memory 330 is adapted to store (i) receiver logic 380 and (ii) rule recommendation subsystem 390. The receiver logic 380 includes a parser 385 that parses the Event report 150 received via the network interface 320 in accordance with event type as well as identifies and extracts meta-information 325 associated with each event. The meta-information 325 associated with the events is stored in data store 335. The rule recommendation subsystem 390 is configured to generate rule recommendations 160, which are output via the network interface 320. The provisional (and final set of) malware detection rules are formulated and verified, as described below in FIGS. 4-6. It is contemplated that the certain components (e.g., reporting logic, testing logic, rule distribution/transmission logic, etc.) may be deployed in the analytic system, separate from the rule generation system 120, to control the dispersion of rule recommendations and/or provisional rules.

The administrative interface 340 is a portal that allows an administrator, after credential exchange and authentication, to access and update logic stored within the memory 330 of the rule generation system 120. For instance, the administrative interface 340 may include authentication logic (not shown) to authenticate an administrator requesting access to stored logic within the rule generation system 120. Upon authentication, the administrator is able to modify (i) the parser 385 of the receiver 380 to change parsing operations as well as the type of events to be parsed from the Event report 150 and (ii) the rule recommendation subsystem 390 to alter one or more of the machine learning models (not shown) corresponding to the event types being parsed by the parser 385 in efforts to more quickly and more accurately generate malware detection rules based on the results produced from the ML models.

As an optional interface, the analyst interface 350 is a portal that allows an analyst, after credential exchange and authentication, to access and update stored meta-information associated with monitored events within the data store 335. For instance, the analyst interface 350 may provide a graphics user interface (GUI) that allows an analyst to conduct search queries for different events based on a variety of search parameters. For instance, the search parameters may be directed to the type of event, a source (upload and/or originating) or time of occurrence as the meta-information for each event provided by the Event report 150 may include, but is not limited or restricted to (i) event type, (ii) time of occurrence (timestamp), (iii) a path for accessing the object under analysis (i.e., file path in memory), (iv) identifier associated with, e.g., hash value of, the object under analysis, and/or (v) process identifier for the process running during detection of the event, or the like. Additionally, the analyst interface 350 allows for adjustment of the score threshold(s) to adjust the throughput of salient features.

Referring now to FIG. 4, an exemplary embodiment of a logical representation of the rule generation system 120 of FIGS. 1-2A is shown. The rule generation system 120 features (i) the receiver logic 380, which includes at least the parser 385 and feature extraction logic 410, (ii) the data store 335, and (iii) the rule recommendation subsystem 390. As shown, the parser 385 is configured to receive the Event report 150 and parse the Event report 150 based on a plurality of event types. These plurality of event types may be permanently set (static) or may be modifiable (dynamic) through a control message 400 uploaded to the parser 385 via the administrative interface 340 or the analyst interface 350 of FIG. 3. As shown, the parser 385 is configured to identify the plurality of event types included in the Event report 150, extract meta-information 325 included in the Event report 150, and organize the meta-information 325 according to event type. Illustrative examples of the event types may include, but are not limited or restricted to (i) registry key changes, (ii) mutex being a program object allowing multiple program threads to share the same resource (e.g., file access); (iii) file command (e.g., Open( ), Close( ), Create( ), etc.); (iv) API call, or the like.

More specifically, the parser 385 may be configured to extract the meta-information 325 associated with each of the event types. As an illustrative example, where the event pertains to a file operation (e.g., Open( )); file command), the meta-information 325 may identify the type of event (e.g., file Open( )); file path URL, file size, time of occurrence of the Open( ) command (e.g., timestamp value), the name of the file being opened (filename), and/or hash value of the file. Additionally, or in the alternative, the parser 385 may be configured to generate the meta-information 325 associated with a selected event type, such as an aggregation of the number of activities associated with the identified event (e.g., the number API calls directed to a particular API within a prescribed period of time, the number of times that a SLEEP command is called within a prescribed period of time, etc.). The extracted and/or generated meta-information 325 may be placed into a readable format and the formatted meta-information 405 is provided to both the feature extraction logic 410 and a searchable data store 220 of labeled events associated with known malware and known goodware. Alternatively, the extracted and/or generated meta-information may be placed into a format that may be parsed and/or processed automatically without human intervention.

The feature extraction logic 410 extracts features 430 from the formatted meta-information 405, where the features 430 may be categorized as either (1) a portion of the formatted meta-information 405 where an occurrence of the formatted meta-information 405 may represent a useful factor in determine a level of maliciousness of an object, or (2) repetitive patterns within text of the formatted meta-information 405 discovered using a sliding window (e.g., N-Gram, Skip-Gram, etc.), which may lead to rule candidate patterns. For example, one of the features 430 may constitute the portion of the formatted meta-information 405 in which an occurrence of particular meta-information is discovered (e.g., object hash value, path identifying location of the object, API name, or any combination thereof). Additionally, or in the alternative, one or the features 430 may constitute a parameter provided in response to at least a prescribed number of occurrences (aggregate) of a particular event (e.g., API calls, Sleep function calls, etc.) within a determined period of time.

It is contemplated that, for some embodiments, the particular features selected from meta-information 325 associated with an event may depend on the event type. For instance, where the event is directed to behaviors conducted by a file within a virtual machine, the features may be directed to content specific to that file that may be more difficult to change (e.g., hash value of the file, file path, etc.) instead of more easily modified content (e.g., filename). Such features, when used as a basis for malware detection rules, are more dispositive in determining whether such features represent that the object is malware or benign.

Thereafter, according to one embodiment of the disclosure, the features 430 are made available to the rule recommendation subsystem 390. As shown, the feature extraction logic 410 stores the features 430 in the data store 335, which is accessible by the rule recommendation subsystem 390. Alternatively, the feature extraction logic 410 may be configured to provide each extracted feature to a corresponding one of a plurality of machine learning (ML) models 440 specific to that identified event type (or combination of events).

Referring still to FIG. 4, the rule recommendation subsystem 390 includes the plurality of ML models 440 each configured to predict a likelihood (represented by a score) of a feature (and its corresponding event) being associated with malware. Herein, each of the plurality of ML models 440 corresponds to a specific event type or a specific combination of events. As an illustrative example, a first ML model 442 may be applied to one or more features from a first event type (event A) received from the feature extraction logic 410 to determine whether the feature is indicative of a potentially malicious behavior while a second ML model 444 may be applied to one or more features from a second event type (event B) and a third ML model 446 may be applied to features from a combination of events (events A&B) to determine whether certain types of features (or combination of features) are indicative of a potentially malicious behavior. Besides generation of a predicted score for a feature, each of the ML models 440 may produce a description, including alphanumeric characters and/or symbols, identifying the prime factors in generation of the assigned score. The description may be added as part of a rule recommendation 160.

In addition to providing the extracted features 430 to the rule recommendation subsystem 390, the feature extraction logic 410 may be configured to conduct a sliding window analysis on incoming meta-information 405 associated with the features to detect the presence of a particular event pattern within the sliding window over a prescribed period of time. The sliding window analysis may be conducted by analyzing timestamps maintained as part of the features and determining a count value representing the number of occurrences (aggregate) of a particular event that occur during a determined period of time. The count value is provided to one or more of the plurality of machine learning (ML) models (e.g., fourth ML model 448), which determines a score for the repetitive occurrence of a particular event. For the fourth ML model 448, the frequency of the event, not the meta-information of the event, determines the likelihood of the particular events denoting a presence of malware.

As also shown in FIG. 4, the rule recommendation subsystem 390 further includes predictive filtering logic 450 and weighting logic 455. The weighting logic 455 is configured to adjust a score associated with a feature in order to take into account that certain features may tend to be more useful in successfully performing a malware detection analysis than other features. The predictive filtering logic 450 may be configured to analyze the scores associated with each feature analyzed by one of the ML models 440 to discover the most salient features to which malware detection rules should be directed.

According to one embodiment of the disclosure, the predictive filtering logic 450 automatically selects a plurality of features (or a combination of features) that are predicted, based on their score values, to operate as the salient features in the formation of the rule recommendations 160. These salient features may be restricted in number (i) on a per object basis (e.g., maximum number of salient features in total may not exceed a first feature threshold such as 20 salient features) and/or (ii) on a per event type basis (e.g., maximum number of salient features per event type may not exceed a second feature threshold such as 4 features per event type). In many analyses, the rule recommendations 160 will include salient features for some, but not all, of the event types.

In light of the foregoing, the predictive filtering logic 450 is configured to exclude, from the rule recommendations 160, those features that may be less effective for detecting malware. As a result, where the score for a feature (or combination of features) exceeds the first score threshold, the predictive filtering logic 450 may include that feature (or combination of features) as part of the rule recommendations 160, provided the per event type restriction (described above) is maintained. Each rule recommendation 160 may include the same syntax as the feature (e.g., a string of meta-information as shown in FIG. 2C) or may include a different syntax (e.g., Boolean logic representation). The rule recommendations 160 are provided to the analytic system 170 for verification.

According to one embodiment of the disclosure, rule recommendation verification may be accomplished by conducting query searches 460 to evaluate the rule recommendations 160, where the query searches 460 are directed to evaluating each salient feature of the rule recommendations 160 with features are associated with known malicious objects and/or benign objects maintained by the data store 220. The data store 220 may be positioned locally to the analytic system 170 or remotely therefrom (e.g., within a cloud service).

Upon initial verification of their applicability in accurately detecting an object incorrectly classified by a cybersecurity system based on the Event report 150 provided, the rule recommendations 160 are translated into provisional malware detection rules 190, which are uploaded to at least one cybersecurity system $110_1$ for malware detection and, in some embodiments, for subsequent use in malware blocking as a final set of malware detection rules once the provisional malware detection rules 190 have been confirmed to operate satisfactorily in the field (e.g., the number of detected FP as determined by the telemetry does not exceed corresponding thresholds). According to one embodiment of the disclosure, if the rule recommendations 160 require an additional iteration before the rule translation (i.e., more rule recommendations are requested), the rule recommendations 160 (or a portion thereof) may be returned to the rule recommendation subsystem 390 and the new rule modification 185 may be generated for features that were previously filtered from the rule recommendations 160.

Where the malware detection rules 190 are determined to be operating unsatisfactorily unreliable (e.g., the number of detected FP exceeds the corresponding thresholds), the rule modification message 180 from the analytic system 170 may cause the rule generation system 120 to supplement the recommended rules 190.

Figure 5:
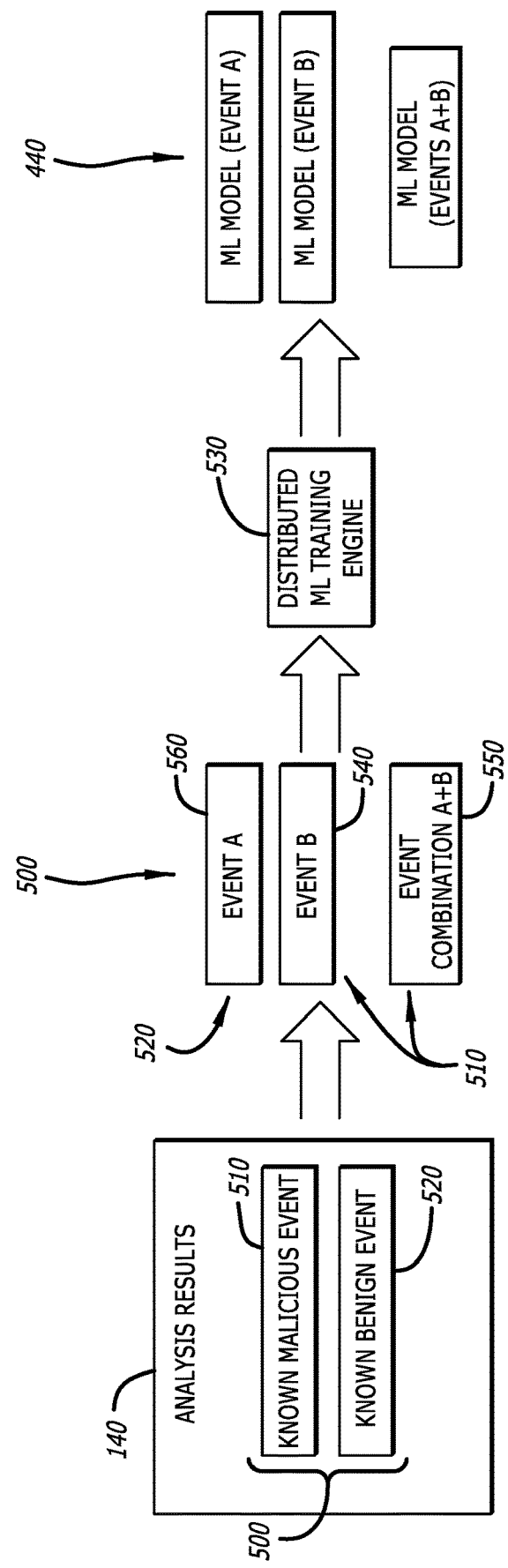
FIG. 5 is an illustrative embodiment of an operations performed during training of a rule recommendation subsystem deployed within the rule generation system.

Referring now to FIG. 5, an illustrative embodiment of an operations performed during training of the rule recommendation subsystem 390 of FIG. 4 being trained through supervised learning is shown. Herein, the analysis results 140 operating as a training set is provided as input to the rule recommendation subsystem 390 during a training session. The analysis results 140 includes meta-information associated with one or more labeled events 500, where each of the labeled events 500 may correspond to either a known malicious event 510 of a particular event type and/or particular combination of events or a known benign event 520 of the particular event type and/or event combination. A distributed ML training engine 530 is configured to receive the labeled events (e.g., malicious events 510 such as event B 540 and event combination A&B 550 and/or benign events 520 such as event A 560), and in response, to update and verify the plurality of ML models 440 for use in generating the recommended rules that predict a threat level (malicious or benign) of the monitored event.

Figure 6:
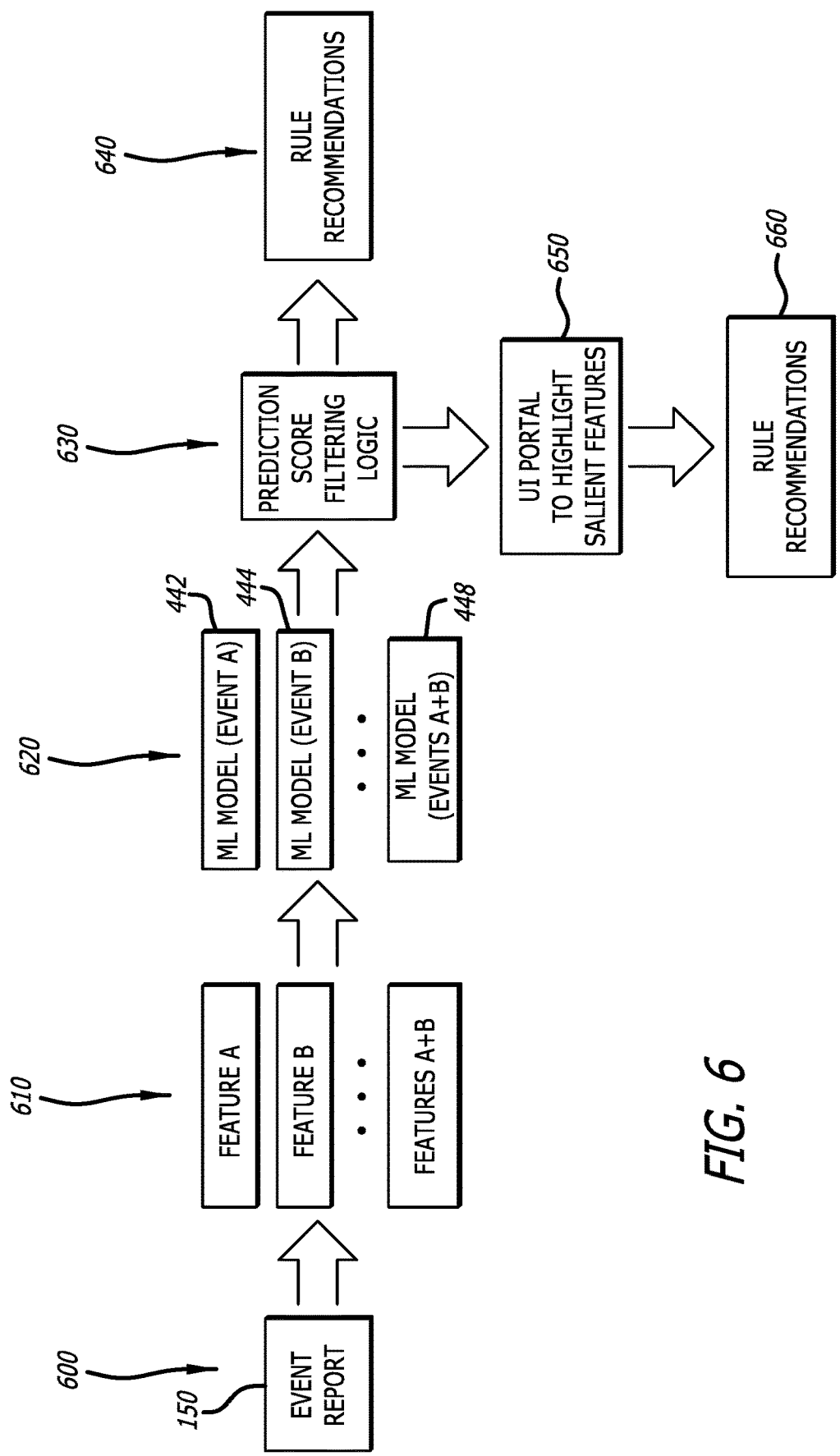
FIG. 6 is an illustrative embodiment of an operations performed by the rule recommendation subsystem of FIG. 4 to automatically filter and generate malware detection rule recommendations pertaining to different event types.

Referring now to FIG. 6, an illustrative embodiment of an operations performed by the rule recommendation subsystem 390 of FIG. 4 to automatically filter and generate malware detection rule recommendations pertaining to different event types. The rule recommendation subsystem 390 is configured to identify and extract meta-information included in the Event report 150 according to certain event types being monitored (operation 600). In particular, the parser is configured to extract meta-information associated with a first set of events (or combination of events) and/or generate meta-information associated with a second set of event types. The first set of events may be mutually exclusive from the second set of events. Herein, from the first and second sets of events, feature A, feature B and the combination of features A&B are extracted from the first set of events (operation 610). For each event type or event combination, a corresponding ML model is applied to the extracted features for that event type or event combination (operation 620).

More specifically, the plurality of ML models are configured for a corresponding plurality of event types and/or combination or sequences of events. Stated differently, each ML model of the plurality of ML models corresponds to a specific event type or event combination and is applied to features associated with the specific event type or event combination. As an illustrative example, the first ML model 442 may be applied to features associated with a first event type (feature A) to determine whether the feature (and corresponding event type) is indicative of a potentially malicious behavior while the second ML model 444 may be applied to features associated with a second event type (feature B) and the fourth ML model 448 may be applied to features associated with a combination of events (features A&B) to determine whether features associated with certain events (or the combination of events) are indicative of a potentially malicious behavior.

According to one embodiment of the disclosure, upon being applied to features associated with a first event type (feature A), the first ML model 442 generates a score representing a scale (e.g., from highest to lowest or lowest to highest) as to the level of correlation between the feature associated with a first event type (feature A) and a level of maliciousness (e.g., association with malware). The same operations are performed by a second ML model 444, which may be applied to features associated with a second event type (feature B), and/or a third ML model 446 may be applied to features associated with a combination of events (features A&B) to determine whether features associated with a particular event (or a combination of events) are indicative of a finding of maliciousness.

Thereafter, according to one embodiment of the disclosure, predictive filtering logic may be configured to analyze the scores associated with each event type and automatically select a prescribed number of features that are predicted, based on the score values, to achieve a higher likelihood of being associated with malware (operations 630 and 640). The prescribed number of features for each event type (or combination of events) form as rule recommendations. Hence, the predictive filtering logic excludes those features that are less effective features for detecting malware from the rule recommendations. Alternatively, according to another embodiment of the disclosure, the predictive filtering logic may be configured to analyze the scores associated with each event type and display the salient features (and score values) on a graphic user interface (GUI) accessible via the administrator interface 340 and/or the analyst interface 350 of FIG. 3 (operation 650). The salient features exceeding a prescribed threshold may be highlighted, but additional features may be selected as part of the rule recommendations or the recommended features may be substituted for other features selected by the analyst for generating the rule recommendations (operation 660).

Figure 7:
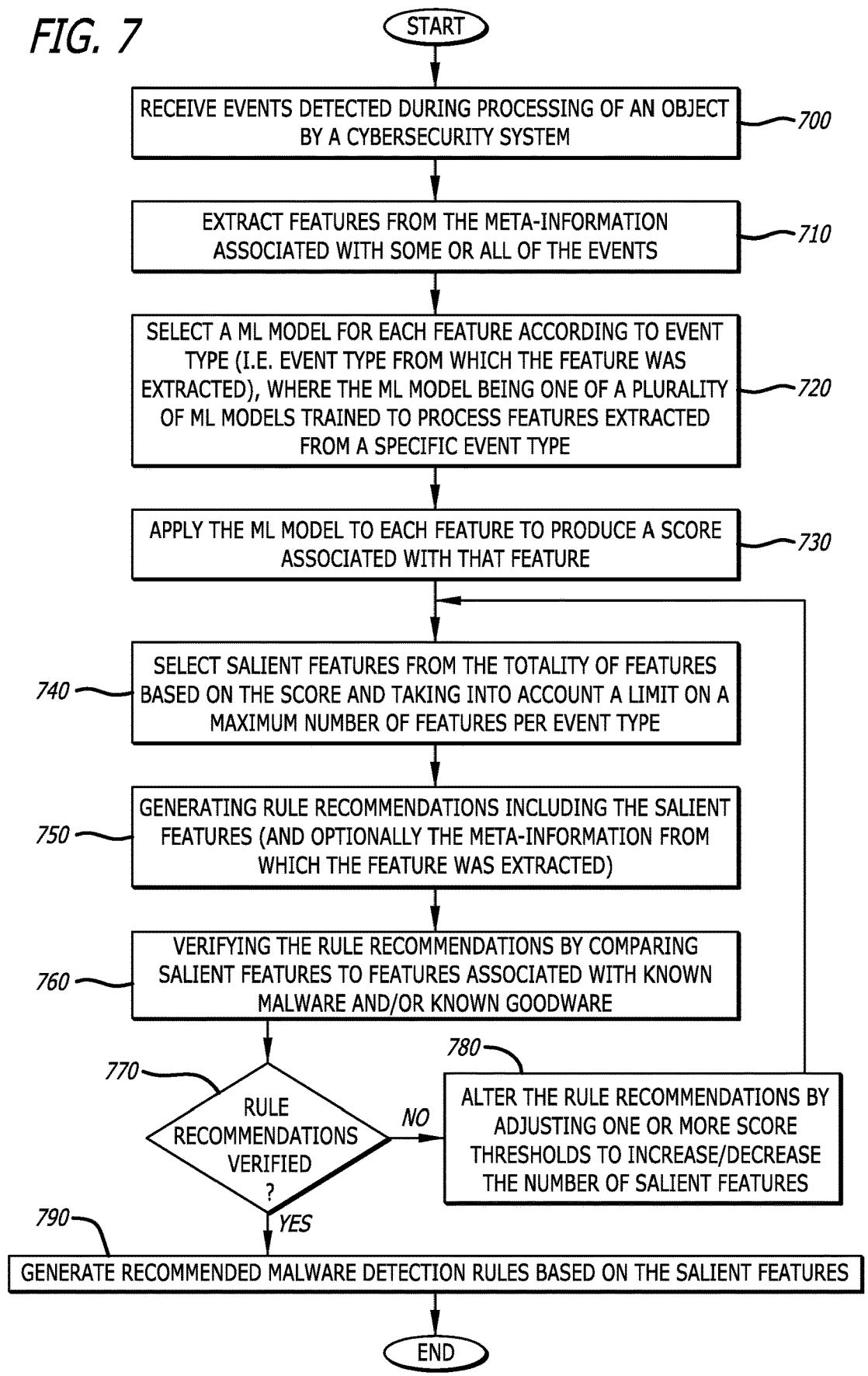
FIG. 7 is an illustrative embodiment of a flowchart outlining the operations conducted by the rule generation system of FIG. 4.

Referring now to FIG. 7, an illustrative embodiment of a flowchart outlining the operations conducted by the rule generation system 120 of FIG. 4 is shown. Herein, a plurality of events detected during processing of an object by a cybersecurity system are received (block 700). These events may be provided from the cybersecurity system or retrieved from a data store utilized by the cybersecurity system. One or more features are extracted from the meta-information associated with each of the plurality of events (block 710). The feature(s) may correspond to a particular portion of the meta-information or a repetitive pattern.

Thereafter, a ML model is selected for each feature according to event type (i.e. event type from which the feature was extracted), where the ML models are trained to process features extracted from specific event type (operation 720). A ML model of a plurality of ML models is applied to each feature according to event type or combination of events (i.e., the event type from which the feature was extracted), where the ML models generate predicted scores associated with each feature (operation 730).

After applying the ML models to each feature, the salient features are determined from the totality of analyzed (modeled) features based on the assigned score (with any optional weighting applied) and taking into account a limit on the maximum number of features per event type (operation 740). As an illustrative example, a first subset of analyzed features (potential salient features) are selected for those features having an assigned score that either (i) meets or exceeds a first score threshold (malicious features) or (ii) meets or falls below a second score threshold (benign features). Thereafter, the salient features are determined from the potential salient features by restricting the number of features associated with an event type from exceeding a maximum event threshold (e.g., less than 5 events, less than 3 events, etc.). Therefore, not all of the event types monitored by the rules generation system may be represented by a salient feature.

Based on these salient features, rule recommendations are generated (operation 750). According to one embodiment of the disclosure, the rule recommendation includes the salient features along with meta-information associated with the event from which the features were extracted.

Thereafter, the rule recommendations are verified by comparing the salient features to features associated with known malware and/or known goodware (operation 760). This verification may be conducted within the same network, same public cloud computing service or same private cloud computing service in which the rule generation system is deployed. If the rule recommendations are verified, the salient features are used as a basis for generation of the provisional malware detection rules that control malware detection analyses by one or more cybersecurity appliance, and the provisional malware detection rules are uploaded to the cybersecurity appliance for use (operations 770 & 780). Alternatively, if the rule recommendations are not verified (i.e., local testing results in FP and/or FN exceeding a prescribed threshold), the rule recommendations may be altered by adjusting a threshold parameter (e.g., decrease/increase the first score threshold or increase/decrease the second score threshold) used in selecting the salient features. This adjust may cause reissuance of a new set of rule recommendations (operations 790) for verification and rollout.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for generating rule recommendations utilized in a creation of malware detection rules, the method comprising:
    receiving meta-information associated with a plurality of events collected during a malware detection analysis of an object by a cybersecurity system and stored in a non-transitory storage medium;
    selecting a first plurality of features from the received meta-information stored in the non-transitory storage medium, each of the first plurality of features being a portion of the meta-information associated with one or more events of the plurality of events;
    applying a machine learning (ML) model of a plurality of ML models to each of the first plurality of features to generate a score, each score representing a level of maliciousness for each of the first plurality of features;

based on the scores generated for each of the first plurality of features, selecting a second plurality of features as salient features, the second plurality of features being a subset of the first plurality of features, the salient features being discriminative in differentiating a malicious event from a benign event; and generating the rule recommendations being used to produce the malware detection rules based on the selected salient features and transmitting the malware detection rules to one or more cybersecurity systems.

2. The computerized method of claim 1, wherein the selecting of the first plurality of features includes identifying a plurality of event types associated with the meta-information and selecting one or more features of the first plurality of features associated with each event type, each of the one or more features associated with each event type, being used as the basis for the malware detection rules, are more dispositive in determining a classification for objects analyzed by the cybersecurity system than remaining features associated with each event type.

3. The computerized method of claim 1, wherein the applying of the machine learning model includes identifying a first feature of the first plurality of features being associated with a first event type and applying a first ML model of the plurality of ML models to the first feature to generate a score representing a level of maliciousness for the first feature, the first ML model being a machine learning model specific to the first event type.

4. The computerized method of claim 3, wherein the applying of the machine learning model further includes identifying a second feature of the first plurality of features being associated with a second event type and applying a second ML model of the plurality of ML models to the second feature to generate a score, the second ML model being a machine learning model specific to the second event type.

5. The computerized method of claim 3, wherein the applying of the machine learning model further includes identifying a second feature of the first plurality of features being associated with the first event type and applying the first ML model of the plurality of ML models to the second feature to generate a score representing a level of maliciousness for the second feature.

6. The computerized method of claim 5, wherein the selecting of the second plurality of features as the salient features includes selecting the second feature representative of the first event type based on the score of the second feature exceeding the score of the first feature.

7. The computerized method of claim 1, wherein each of the rule recommendations includes the meta-information for events of the plurality of events that include at least one salient feature of the salient features being highlighted on a graphical user interface accessible via an administrator interface or analyst interface.

8. The computerized method of claim 7, wherein the highlighting of the at least one salient feature includes reordering the at least one salient feature within the meta-information for an event placement at a prescribed location within the meta-information to assist in parsing of the at least one salient feature from the meta-information.

9. The computerized method of claim 1, wherein the applying of the ML model further generates a description identifying prime factors in generation of the score, the description being provided with the rule recommendations.

10. The computerized method of claim 1 further comprising:

accessing the rule recommendations and extracting the salient features, the salient features being used as a basis for generating the malware detection rules.

11. The computerized method of claim 1 further comprising:

verifying reliability of the rule recommendations by analysis of the salient features being features associated with known malware and known goodware.

12. The computerized method of claim 1, wherein the rule recommendations being based on the plurality of events collected during the malware detection analysis of the object conducted during static analysis of the object in which characteristics of the object are analyzed without execution of the object.

13. The computerized method of claim 1, wherein the rule recommendations being based on the plurality of events collected during the malware detection analysis of the object conducted during execution of the object within a virtual machine.

14. The computerized method of claim 1, wherein the rule recommendations being based on the plurality of events collected during the malware detection analysis of the object conducted during initial classification of the object at the cybersecurity system in determining whether the object is potentially associated with malware or benign.

15. The computerized method of claim 1, wherein an aggregate of a first feature of the first plurality of features is considered when generating a score associated with the first feature.

16. The computerized method of claim 15, wherein an aggregate associated with each feature is considered by a ML model of the one or more ML models of the plurality of ML models when generating the score.

17. The computerized method of claim 1, wherein each of the plurality of ML models comprises executable software.

18. The computerized method of claim 1, wherein a score assigned to a feature of the first plurality of features can be adjusted based on a selected weighting scheme.

19. The computerized method of claim 1, wherein each of the plurality of ML models generating a result including the score and information supporting or explaining a rationale behind the score.

20. The computerized method of claim 1, wherein each of the salient features includes a prediction score that surpasses a selected threshold.

21. The computerized method of claim 1, wherein one or more ML models of the plurality of ML models perform operations on features directed to a different event type.

22. The computerized method of claim 1, wherein one or more ML models of the plurality of ML models are configured to analyze parameters that are based on an aggregate of the first plurality of features occurring within a set time period or an absence of certain features.

23. A rule generation system for generating rule recommendations utilized in a creation of malware detection rules, comprising:

a parser, stored in one or more non-transitory storage mediums, configured to extract meta-information associated with a plurality of events received as part of results of a malware detection analysis of an object conducted by a cybersecurity system, each of the plurality of events includes a monitored characteristic or behavior detected during the malware detection analysis of the object;

a feature extraction logic communicatively coupled to the parser and stored in the one or more non-transitory storage mediums, the feature extraction logic to select a first plurality of features from the received meta-information, each of the first plurality of features being a portion of the meta-information associated with an one or more events of the plurality of events; and a rule recommendation subsystem communicatively coupled to the feature extraction logic and stored in the one or more non-transitory storage mediums, the rule recommendation subsystem comprises a plurality of machine learning (ML) models each directed to a specific event or a specific group of events of the plurality of events, the rule recommendation subsystem to apply one or more ML models of the plurality of ML models to the first plurality of features and each of the one or more ML models generates a score for each of the first plurality of features to which each is applied, each score representing a level of confidence of maliciousness, and a predictive filtering logic configured to, based on the scores generated for each of the first plurality of features, select a second plurality of features as salient features the second plurality of features being a subset of the first plurality of features, the salient features being discriminative in differentiating a malicious event from a benign event; and wherein the rule recommendation subsystem generating rule recommendations being used to produce the malware detection rules based on the selected salient features.

24. The rule generation system of claim 23, wherein the feature extraction logic being configured to select the first plurality of features and coordinate a supply of (i) a first subset of the first plurality of features associated with a first event type of a plurality of event types to a first ML model of the plurality of ML models and (ii)) a second subset of the first plurality of features associated with a second event type of the plurality of event types to a second ML model of the plurality of ML models.

25. The rule generation system of claim 23, wherein the feature extraction logic to select the first plurality of features by at least identifying a plurality of event types associated with the meta-information and selecting one or more features associated with each event type, each of the one or more features associated with each event type, being used as the basis for the malware detection rules, is more dispositive in determining a classification for objects analyzed by the cybersecurity system than remaining features associated with each event type.

26. The rule generation system of claim 23, wherein the rule recommendation subsystem to apply the one or more ML models by at least identifying a first feature of the first plurality of features being associated with a first event type and applying a first ML model of the plurality of ML models to the first feature to generate a score representing a level of maliciousness for the first feature, the first ML model being a machine learning model specific to the first event type.

27. The rule generation system of claim 26, wherein the rule recommendation subsystem to further apply the ML model by at least identifying a second feature of the first plurality of features being associated with a second event type and applying a second ML model of the plurality of ML models to the second feature to generate a score, the second ML model being a machine learning model specific to the second event type.

28. The rule generation system of claim 26, wherein the rule recommendation subsystem to further apply the one or more ML models by at least identifying a second feature of the first plurality of features being associated with the first event type and applying the first ML model of the plurality of ML models to the second feature to generate a score representing a level of maliciousness for the second feature.

29. The rule generation system of claim 26, wherein the predictive filter logic to select the second plurality of features as the salient features based on scores generated for each of the first plurality of features, the second plurality of features being a subset of the first plurality of features.

30. The rule generation system of claim 23, wherein the predictive filtering logic further generating the rule recommendations, each of the rule recommendations includes the meta-information for events of the plurality of events that include at least one salient feature and the at least one salient feature being highlighted on a graphical user interface accessible via an administrator interface or analyst interface.

31. The rule generation system of claim 30, wherein the highlighting of the at least one salient feature includes reordering the at least one salient feature within the meta-information for an event placement at a prescribed location within the meta-information to assist in parsing of the at least one salient feature from the meta-information.

32. The rule generation system of claim 30, wherein the applying of the ML model by the rule recommendation subsystem further generates a description identifying prime factors in generation of the score, the description being provided with the rule recommendations.

33. The rule generation system of claim 23, wherein one or more ML models of the plurality of ML models perform operations on features directed to a different event type.

34. The rule generation system of claim 23, wherein one or more ML models of the plurality of ML models are configured to analyze parameters that are based on an aggregate of the first plurality of features occurring within a set time period or an absence of certain features.

35. A cloud-based system comprising:

a rule generation system for generating rule recommendations utilized in a creation of malware detection rules, the rule generation system includes one or more non-transitory storage mediums that stores logic that comprise (i) a parser configured to extract meta-information associated with a plurality of events received as part of downloaded results of a malware detection analysis of an object conducted by a cybersecurity system, (ii) a feature extraction logic to select a first plurality of features from the received meta-information, each of the first plurality of features being a portion of the meta-information associated with one or more events of the plurality of events, and (iii) a rule recommendation subsystem including (a) a plurality of machine learning (ML) models each directed to a specific event or group of events of the plurality of events, the rule recommendation subsystem to apply one or more ML models to the first plurality of features and the one or more ML models generates a score for each of the first plurality of features to which the one or more ML models is applied representing a level of maliciousness for the feature and thereby usefulness of the feature in classifying the object as malicious or benign based on this feature, (b) a predictive filtering logic configured to (1) select a second plurality of features as salient features, the second plurality of features being a subset of the first plurality of features and the salient features being discriminative in differentiating a malicious event from a benign event, and (2) generate rule recommendations being used to produce the malware detection rules based on the selected salient features and transmitting the malware detection rules to one or more cybersecurity systems; and analytic system communicatively coupled to the rule recommendation subsystem of the rule generation system, the analytic system to receive the rule recommendations and generate the malware detection rules based on the rule recommendations.

* * * * *